United States Patent [19]
Becker

[11] 3,986,587
[45] Oct. 19, 1976

[54] SPEED RESPONSIVE CLUTCH FOR LOCKING A FLUID COUPLING

[75] Inventor: John Edward Becker, Bowmanville, Canada

[73] Assignee: Cluaran Associates Ltd., Oshawa, Canada

[22] Filed: Feb. 18, 1975

[21] Appl. No.: 547,913

[52] U.S. Cl. ............................ 192/3.29; 192/105 A; 60/330
[51] Int. Cl.² .......................................... F16D 47/06
[58] Field of Search ............... 192/105 A, 85 F, 3.3, 192/3.31, 3.29

[56] References Cited
UNITED STATES PATENTS

| | | | |
|---|---|---|---|
| 1,857,016 | 5/1932 | Götz | 192/105 A |
| 2,723,735 | 11/1955 | Banker | 192/3.31 X |
| 2,833,385 | 5/1958 | Peterson et al. | 192/105 A |
| 3,088,563 | 5/1963 | Petrie et al. | 192/3.29 X |
| 3,485,328 | 12/1969 | Bilton | 192/105 A X |

*Primary Examiner*—Benjamin W. Wyche
*Attorney, Agent, or Firm*—Hirons & Rogers

[57] ABSTRACT

A speed-sensitive device comprises a cylinder mounted on a shaft and rotatable therewith. The cylinder contains liquid that is pushed by the action of centrifugal force against a piston, the piston being connected to engage a clutch when the shaft speed reaches a predetermined minimum value. A speed-sensitive valve opens a bore connecting the opposite sides of the piston when the speed is above a minimum value to prevent a vacuum affecting the operation. The principal application is to a fluid coupling and the device operates a mechanical clutch that "locks up" the fluid coupling above the predetermined speed to prevent slip losses therein.

3 Claims, 2 Drawing Figures

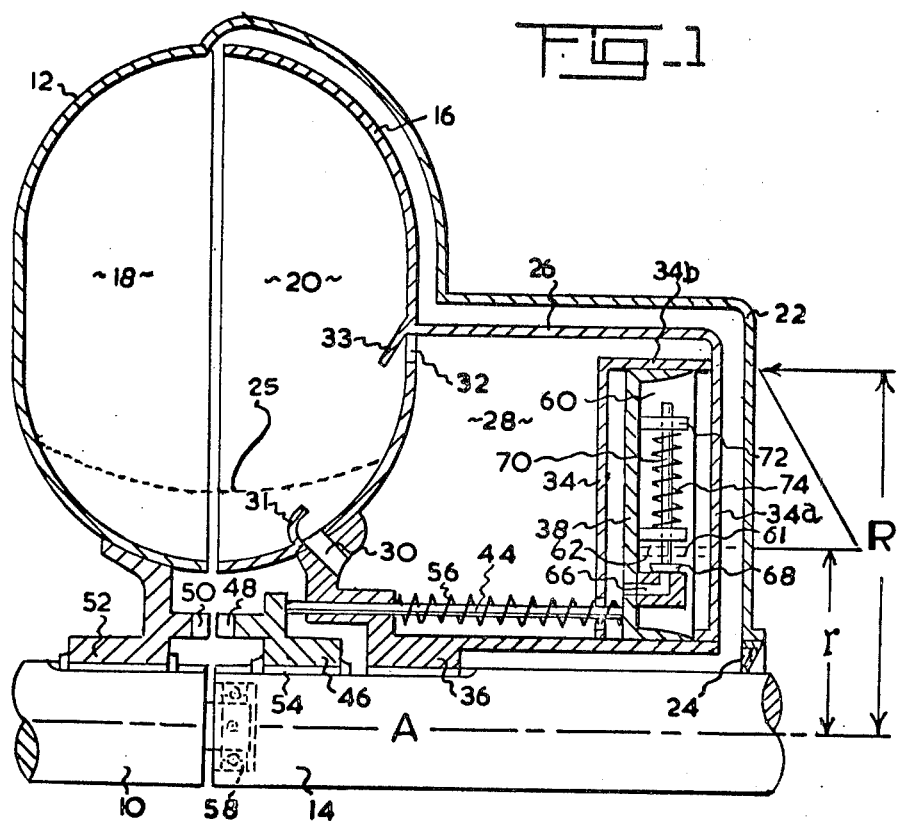
Fig_1
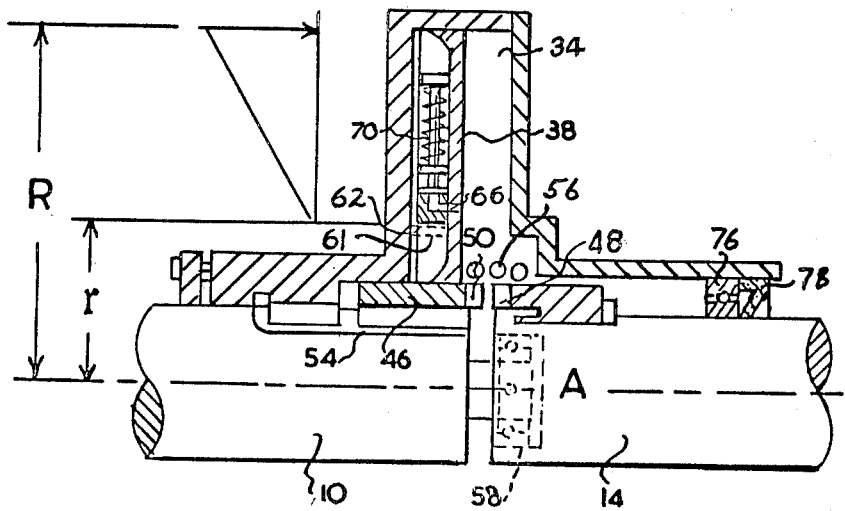
Fig_2

SPEED RESPONSIVE CLUTCH FOR LOCKING A FLUID COUPLING

1. Field of the Invention

The present invention is concerned with a speed sensitive device for power transmissions, and especially but not exclusively with a speed-sensitive lock-out device that is particularly suitable for use with fluid couplings and clutches.

2. Review of the Prior Art

The significant advantages to be obtained by use of a power transmission including a hydraulic coupling or clutch have led to their wide adoption in a number of fields. The majority of such fluids devices currently in commercial use are of the type wherein power is transmitted through the device upon the establishment therein of a plurality of fluid vortices between cooperating vaned pump and turbine elements. The establishment and maintenance of the power-transmitting vortices in such devices is dependent upon the presence of rotational slip between the cooperating elements; in a well-designed device such slip can be as low as 2%, but it is not unknown for it to be as high as 6%.

Such slip represents a constant loss of power in the transmission, which can become significant over the working life of the transmission, especially in view of the expectation of constantly rising energy costs. For example, in a system employing a 50 h.p. electric motor as the prime mover for a normal weekly period of 40 hours the loss can amount to over 3000 kwhrs per year. The slip also results in another more direct cost in that the power lost causes the generation of heat which must be dissipated in some way by the device, either by an integral cooling system, or frequently by means of an external cooler to which the working fluid is circulated.

DEFINITION OF THE INVENTION

It is the object of the present invention to provide a new speed-sensitive device for use in power transmissions.

It is a more specific object to provide a new speed-sensitive device especially suitable for use as an automatic lock-out device in association with a fluid clutch or coupling.

In accordance with the present invention there is provided a speed-sensitive clutch device comprising cooperating power input and output shafts; engageable clutch members carried by the said shafts and movable relative to one another to clutch and declutch the shafts relative to one another; a chamber rotatable with one of the shafts and containing a working liquid which is subjected to centrifugal force upon such rotation; moving means for applying pressure force generated in the working liquid by rotation of the chamber and the contained liquid for moving the clutch members relative to one another; the said moving means comprising a piston member within the chamber and to which the liquid pressure is applied, the respective clutch member being movable with the piston member; the piston member having a vent therein for connecting together the two sides of the piston member and for passage of air therethrough; and a speed sensitive valve closing the said vent when the piston member is rotating at less than a predetermined speed.

The said device may be connected with or constitute part of a fluid clutch or coupling and serves to lock-out the associated clutch or coupling upon reaching a predetermined speed of rotation, so as to obtain slipless transmission of power.

DESCRIPTION OF THE DRAWING

A speed sensitive lock-out device which is a particular preferred embodiment of the invention will now be described, by way of example, with reference to the accompanying diagrammatic drawing wherein:

FIG. 1 is a plane longitudinal cross-section of the upper part of a fluid clutch incorporating a device taken on the axis of rotation of its coaxial input and output shafts, and FIG. 2 is a similar view showing a modified vent valve.

Similar parts are given the same reference number in both figures of the drawing.

DESCRIPTION OF THE PREFERRED EMBODIMENTS

The device to be described is readily incorporated into a fluid coupling or clutch as an operative part thereof and as illustrated by FIG. 1 may be located inside the associated device. Alternatively as illustrated by FIG. 2 it may be constructed as a separate unit disposed outside the device and connected thereto by suitable gearing.

The fluid clutch into which the device is incorporated comprises an input shaft 10 carrying a pump element 12 and a coaxial output shaft 14 carrying a cooperating turbine element 16, the shafts rotating about an axis A—A. The two elements are provided with respective radially-extending vortex-producing vanes 18 and 20 respectively. An extension 22 of the pump element extends around the turbine element, a rotating seal 24 being provided between it and the shaft 14. The radially inner boundary of the normal power-transmitting vortices is indicated by the reference 25. An extension 26 of the turbine element constitutes a reservoir 28 rotatable therewith, and is filled with liquid from the coupling working chamber under stall or slowed condition of the turbine element via openings 30, such filling being assisted by catches 31. The reservoir empties when sufficient operating speed is reached through openings 32, the discharge being assisted by the suction created by fluid deflectors 33. A housing 34 is fastened rigidly to the turbine element and in this embodiment is mounted within the reservoir 28, the turbine element being mounted on a boss 36. Annular wall 34a of housing 34 and the cylindrical wall 34b, form an annular cylinder in which a piston member 38 is movable axially of the shafts 10 and 14.

The piston member 38 is connected directly (FIG. 2) or via push rods 44 (FIG. 1) to a sliding member 46 carrying clutch teeth 48 which are engageable with cooperating teeth 50 on an annular boss 52 on which the pump element 12 is mounted. The member 46 slides on splines 54 so as to be rotatable with the shaft 14. A compression spring 56 is interposed between the piston member 38 and housing boss 36 and urges the member 38 to the position in which the clutch teeth 48 and 50 are disengaged. The shafts are mutually supported relative to one another by an interposed bearing 58, and by other bearings (not shown) that support the shafts from an enclosing casing (also not shown). O-ring seals are provided at different locations in the device, as will be apparent to those skilled in the art.

A predetermined quantity of a suitable working liquid is contained in the closed space 60 between wall 34a and piston member 38 and has centrifugal force applied thereto as the shafts rotate. At low r.p.m. the liquid level will be at the position 61 indicated. The force on the liquid is applied to the piston 38 and moves it toward the engaged position against the action of the spring 56. The force acting on the piston will depend upon the specific gravity of the liquid, the r.p.m., the height of the liquid column R-r and the radial distance of the chamber from the axis A—A, and it is possible to calculate accurately the r.p.m. at which the mechanical clutch constituted by the teeth 48 and 50 will engage. At this time the liquid level will be at the position 62.

Since the shafts 10 and 14 are moving at close to the same speed at the time of engagement no special synchronization is needed. However, if necessary a cushioning device can be provided between either sets of teeth and their respective shafts, and/or between the sets of teeth themselves, in order to withstand this "coupling shock". As soon as the teeth are engaged the clutch or coupling constituted by the elements 12 and 16, or the shafts 10 and 14, is effectively "locked out" and thereafter power transmission takes place without the slip loss.

Upon slow down for any reason the force on the piston 38 diminishes and the spring 56 returns the teeth to the disengaged position; the only force that needs to be overcome is the friction of the O-ring seals and the splines. The radius R can be relatively small, since considerable pressure is built up at the r.p.m. normally used, supplying a large force to the piston.

A vent 66 is provided to relieve the partial vacuum that will be created in the compartment 60 by movement of the piston 38 to engage the mechanical clutch teeth 48 and 50. In the absence of such a vent the force available from the centrifugal force acting on the liquid may not be sufficient to overcome the frictions, etc. when this vacuum force is added thereto.

With the turbine element stationary the vent 66 is closed by a valve member 68, the member being carried by a valve stem 70 that slides radially in guides 72. A spring 74 around the stem 70 urges the valve to the closed position. As the speed of the shaft 14 increases the centrifugal force moves the valve to open against the bias of the spring 74, so that the space 60 communicates with the other side of the piston clear of the liquid in the space 60, making it possible for the liquid to move the piston. The valve opens at a speed considerably less than that required for the piston 38 to act against the spring 56, and is arranged to close before the shaft 14 can come to a stop, preventing loss of liquid from chamber 60. In other embodiments the vent 66 may connect the interior of the chamber 60 to the external atmosphere.

In the embodiment illustrated by FIG. 2 the housing 34 is splined to the input shaft 10 on splines 54, as is the piston member 38, part of the housing surrounding the shaft 14 with a bearing 76 and a seal 78. The spring 56 is a compression spring between an inner wall of the housing 34 and the piston member. The clutch teeth are in this embodiment stationary axially, while the teeth 50 are moved for the necessary engagement. The pressure used for moving the clutch teeth 48 and 50 relative to one another is therefore generated by rotation of the input shaft 10 instead of the output shaft 14. In cases such as the embodiments of FIG. 2 where there is no associated coupling or clutch to drive the two shafts at about the same speed, it may be necessary to provide a coupling device, such as a friction member, between them, this coupling device being locked out of operation when a predetermined speed has been reached.

I claim:
1. A speed-sensitive clutch device comprising cooperating power input and output shafts;
   engageable clutch members carried by the said shafts and movable relative to one another to clutch and declutch the shafts relative to one another;
   a chamber rotatable with one of the shafts and containing a working liquid which is subjected to centrifugal force upon such rotation;
   moving means for applying pressure force generated in the working liquid by rotation of the chamber and the contained liquid for moving the clutch members relative to one another;
   the said moving means comprising a piston member within the chamber and to which the liquid pressure is applied, the respective clutch member being movable with the piston member;
   the piston member having a vent therein for connecting together the two sides of the piston member and for passage of air therethrough;
   and a speed sensitive valve closing the said vent when the piston member is rotating at less than a predetermined speed.

2. A speed-sensitive device as claimed in claim 1, wherein the said device is connected with or constitutes part of a fluid clutch or coupling and serves to lock-out the associated clutch or coupling upon reaching a predetermined speed of rotation, so as to obtain slipless transmission of power.

3. A speed-sensitive device as claimed in claim 1, wherein the said chamber is disposed within a reservoir rotatable with one of the elements and receiving working liquid upon the existence of a slowed or stall condition of the said element.

* * * * *